US008526089B2

(12) United States Patent
Krastev et al.

(10) Patent No.: US 8,526,089 B2
(45) Date of Patent: Sep. 3, 2013

(54) MEMS SCANNING MICROMIRROR

(75) Inventors: Krassimir T. Krastev, Eindhoven (NL); Hendrikus W. L. A. M. van Lierop, Eindhoven (NL); Herman M. J. Soemers, Eindhoven (NL); Renatus Hendricus Maria Sanders, Eindhoven (NL); Antonius Johannes Maria Nellissen, Eindhoven (NL)

(73) Assignee: Innoluce B.V., Eindhoven (NL)

( * ) Notice: Subject to any disclaimer, the term of this patent is extended or adjusted under 35 U.S.C. 154(b) by 540 days.

(21) Appl. No.: 12/681,622

(22) PCT Filed: Sep. 29, 2008

(86) PCT No.: PCT/IB2008/053961
§ 371 (c)(1),
(2), (4) Date: Aug. 3, 2010

(87) PCT Pub. No.: WO2009/044331
PCT Pub. Date: Apr. 9, 2009

(65) Prior Publication Data
US 2010/0296146 A1    Nov. 25, 2010

Related U.S. Application Data

(60) Provisional application No. 60/977,721, filed on Oct. 5, 2007.

(51) Int. Cl.
*G02B 26/08* (2006.01)
(52) U.S. Cl.
USPC ...................................... 359/198.1

(58) Field of Classification Search
USPC .................. 359/223.1–226.1, 290, 291, 871, 359/872
See application file for complete search history.

(56) References Cited

U.S. PATENT DOCUMENTS

| 5,661,591 A | 8/1997 | Lin et al. |
| 2004/0165289 A1 | 8/2004 | Ealey |

(Continued)

FOREIGN PATENT DOCUMENTS

| WO | 2006131916 A1 | 12/2006 |
| WO | WO 2009/044331 A1 | 4/2009 |

OTHER PUBLICATIONS

Shu-Ting Hsu, et al., "Ultra flat high resolution microscanners," Optical MEMS and Nanophotonics, 2007 IEEE/LEOS International Conference on, IEEE, PI, Aug. 1, 2007, pp. 197-198, XP031155636, ISBN: 978-1-4244-0641-8.

(Continued)

*Primary Examiner* — Euncha Cherry
(74) *Attorney, Agent, or Firm* — Hoffmann & Baron, LLP

(57) ABSTRACT

A MEMS scanning micromirror including a mirror body 50, the mirror body 50 having a rotation axis 58 with a pair of extension bars 56 parallel to the rotation axis 58; a frame 60 forming a mirror recess 62 with a recess periphery 64, the frame 60 having a pair of opposed frame bars 66 on the recess periphery 64 along the rotation axis 58; a pair of cantilever beam assemblies 70, each of the pair of cantilever beam assemblies 70 being fixed to one of the pair of opposed frame bars 66 and coupled to one end of the pair of extension bars 56; and a pair of vertical support beams 40 connected between each of the pair of opposed frame bars 66 to the mirror body 50 along the rotation axis 58.

24 Claims, 12 Drawing Sheets

(56) References Cited

U.S. PATENT DOCUMENTS

2005/0036196 A1 2/2005 Barnea et al.
2005/0046504 A1 3/2005 Xiaoyu et al.
2005/0088715 A1 4/2005 Yoda
2007/0194225 A1* 8/2007 Zorn .............................. 250/306

OTHER PUBLICATIONS

Chang-Hyeon Ji, et al., "An electrostatic scanning micromirror with diaphragm mirror plate and diamond-shaped reinforcement frame," Journal of Micromechanics & Microengineering, Institute of Physics Publishing, Bristol, GB, vol. 16, No. 5, May 1, 2006, pp. 1033-1039, XP020104998, ISSN: 0960-1317.

Milanovic, et al., "Gimbal-Less Monolithic Silicon Actuators for Tip-Tilt-Piston Micromirror Appliations," IEEE Journal of Selected Topics in Quantum Electronics., IEEE Service Center, Piscataway, N.J., U.S., vol. 10, No. 3, May 1, 2004, pp. 462-471, XP011116292, ISSN: 1077-260X, Figures: 11, 12: p. 469, p. 470.

Alexander Wolter, et al., "Scanning 2D micromirror with enhanced flatness at high frequency," Proceedings of the SPIE, vol. 6114, 2006, pp. 61140L-1-61140L-8, XP002512677, Abstract; Figures: 2, 3.

Lixia Zhou, et al., "Scanning Micromirrors Faricated by an SOI/SOI Wafer-Bonding Process," Journal of Microelectromechanical Systems, vol. 15, No. 1, Feb. 2006, pp. 24-32, XP002512678, Figure: 9.

* cited by examiner

MEMS SCANNING MICROMIRROR

CROSS-REFERENCE TO RELATED APPLICATIONS

This application claims priority from U.S. provisional application No. 60/977,721, filed Oct. 5, 2007. U.S. provisional No. 60/977,717, filed Oct. 5, 2007 and U.S. provisional No. 60/977,713, filed Oct. 5, 2007 are related applications.

BACKGROUND OF THE INVENTION

The technical field of this disclosure is Micro Electro Mechanical Systems (MEMS), particularly, MEMS scanning micromirrors.

MEMS scanning micromirrors have been developed for the display of visual information. The MEMS scanning micromirror oscillates in one or two dimensions and a laser or other light beam reflects from the mirror surface. Varying the angle and timing of the beam incident on the mirror surface generates a visual image on a screen or other surface, such as a two dimensional display matrix. Different numbers of MEMS scanning micromirrors and lasers are used to produce images of different detail and colors. Exemplary uses for the MEMS scanning micromirrors are head up displays for automotive applications, wearable displays, projection displays, mobile phone and hand-held displays, and barcode scanners.

The present generation of MEMS scanning micromirrors includes a mirror plate attached to a frame by two collinear torsion beams, which create a scanning axis about which the mirror plate rotates. The torsion beams both support the mirror plate and provide the required torsional stiffness during rotation. The torsion beams are the only point of attachment between the mirror plate and the frame, and determine the resonant frequency of the MEMS scanning micromirror. The MEMS scanning micromirror also includes a driver to magnetically or electrically apply a torque to the mirror plate about the scanning axis without physical contact with the mirror plate. The driver typically drives the mirror plate at the resonant frequency. MEMS scanning micromirrors are made from single crystal silicon or polysilicon material using photolithography.

Problems with image quality in the present generation of MEMS scanning micromirrors occur due to undesired motion of the mirror and mirror deformation. High image resolution is desirable for better image quality and larger displays. Because the torsion beams are the only point of attachment between the mirror plate and the frame, the torsion beams define the suspension stiffness in all directions, not only rotational stiffness about the scanning axis. The torsion beam geometry, with the mirror mass and the mass inertia moment for the corresponding rotation, influence the higher order resonant frequencies of the system. The most important higher order resonant modes are out-of-plane rocking mode, vertical translation mode, in-plane rotation mode, and horizontal translation mode. Out-of-plane rocking and the vertical translation resonant modes in the present generation of MEMS scanning micromirrors greatly reduce the image quality of the scanner display.

Micromirror dynamic deformation also reduces the image quality of the scanner display. Deformation should not be higher than $\pm\lambda/10$, where $\lambda$ is the shortest laser wavelength used in the scanning application. Image resolution is proportional to the product of scanning angle and micromirror diameter. Higher image resolution requires larger scanning angles, which increase the stress in the torsion beam, and higher scanning frequencies, which increase micromirror dynamic deformation. Because the torsion beams are the only point of attachment between the mirror plate and the frame, the torsion beams deform the mirror plate and the micromirror.

It would be desirable to have a MEMS scanning micromirror that would overcome the above disadvantages.

SUMMARY OF THE INVENTION

One aspect of the present invention provides a MEMS scanning micromirror including a mirror body, the mirror body having a rotation axis with a pair of extension bars parallel to the rotation axis; a frame forming a mirror recess with a recess periphery, the frame having a pair of opposed frame bars on the recess periphery along the rotation axis; a pair of cantilever beam assemblies, each of the pair of cantilever beam assemblies being fixed to one of the pair of opposed frame bars 66 and coupled to one end of the pair of extension bars; and a pair of vertical support beams connected between each of the pair of opposed frame bars to the mirror body along the rotation axis.

Another aspect of the present invention provides a MEMS scanning micromirror including a mirror body, the mirror body having a rotation axis with a first extension bar and a second extension bar parallel to the rotation axis; a frame having a mirror recess with a recess periphery, the frame having a first opposed frame bar and a second opposed frame bar on the recess periphery along the rotation axis; a first cantilever beam fixed to the first opposed frame bar perpendicular to the rotation axis and coupled to a first end of the first extension bar; a second cantilever beam fixed to the first opposed frame bar perpendicular to the rotation axis and coupled to a first end of the second extension bar; a third cantilever beam fixed to the second opposed frame bar perpendicular to the rotation axis and coupled to a second end of the first extension bar; a fourth cantilever beam fixed to the second opposed frame bar perpendicular to the rotation axis and coupled to a second end of the second extension bar; a first vertical support beam connected between the first frame opposed bar and the mirror body along the rotation axis; and a second vertical support beam connected between the second opposed frame bar and the mirror body along the rotation axis.

Another aspect of the present invention provides a MEMS scanning micromirror system including a frame; a micromirror body having a rotation axis; means for supporting the micromirror body in the frame; and means for providing torsional stiffness to the micromirror body about the rotation axis.

The foregoing and other features and advantages of the invention will become further apparent from the following detailed description of the presently preferred embodiments, read in conjunction with the accompanying drawings. The detailed description and drawings are merely illustrative of the invention, rather than limiting the scope of the invention being defined by the appended claims and equivalents thereof.

DETAILED DESCRIPTION OF THE PREFERRED EMBODIMENTS

Figure 1A:
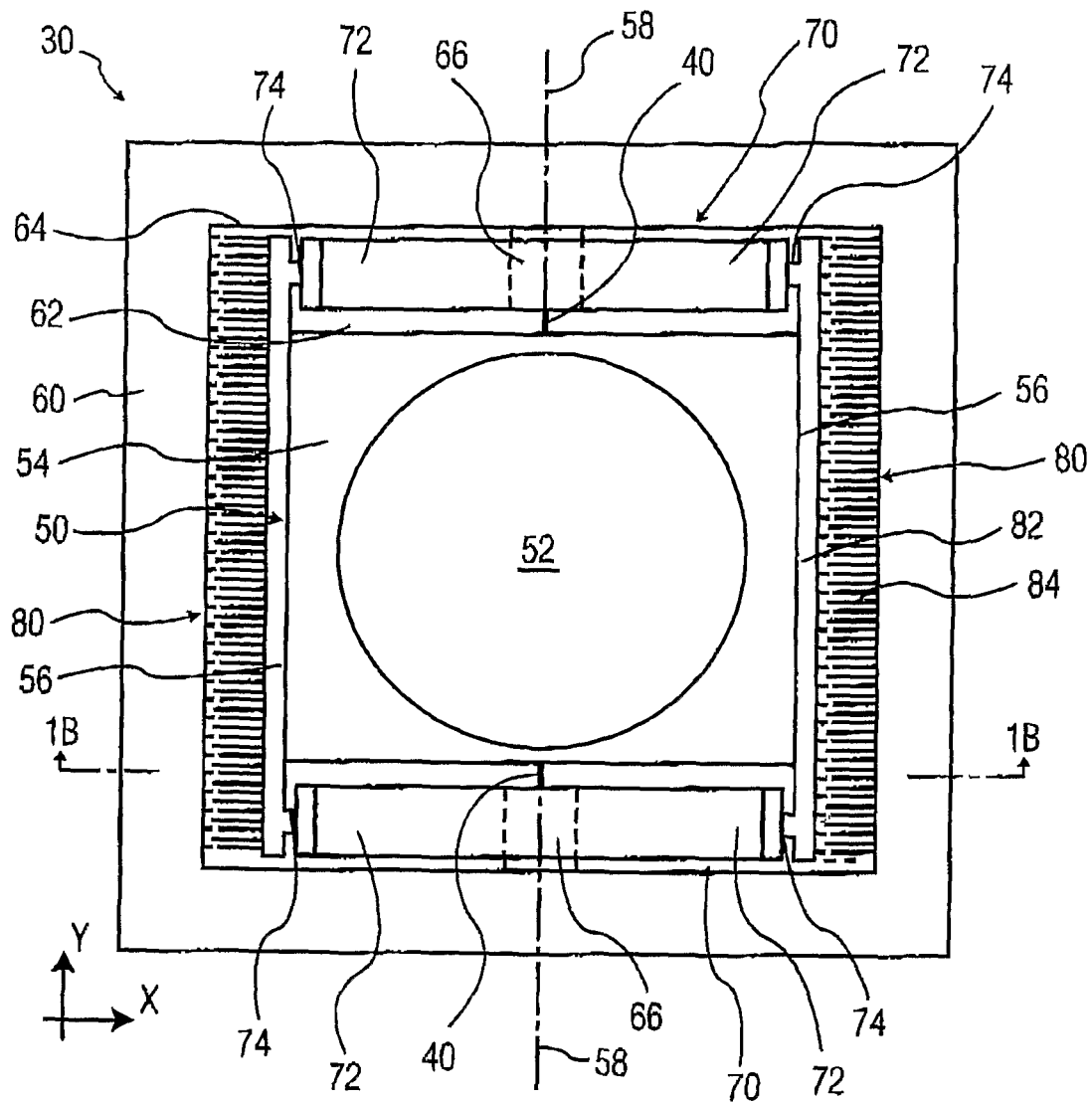
FIGS. 1A-1B are a top and cross section view, respectively, of a MEMS scanning micromirror in accordance with the present invention.
Figure 1B:
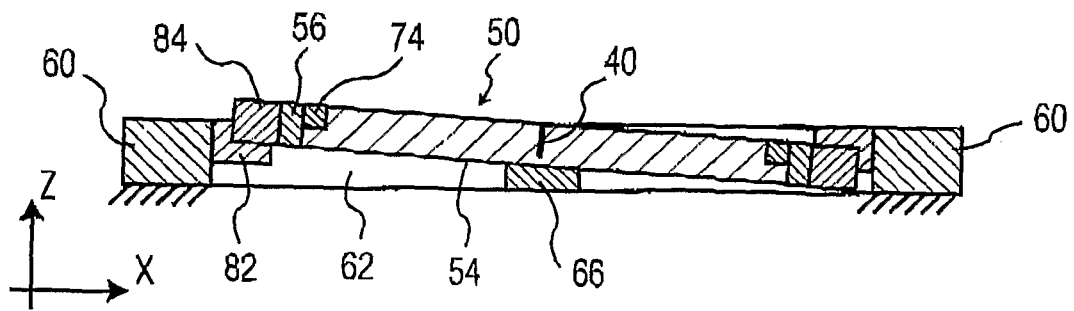

FIGS. 1A-1B, in which like elements share like reference numbers, are a top and side view, respectively, of a MEMS scanning micromirror in accordance with the present invention. FIG. 1B is a cross section along section A-A of FIG. 1A with the mirror body tilted about the rotation axis. The MEMS scanning micromirror uses a pair of cantilever beam assemblies coupled to a mirror body at its outer corners to set the torsional stiffness about the rotation axis. A pair of vertical support beams supports the mirror body vertically at the rotation axis, but have a negligible effect on the torsional stiffness, so that the natural frequency of the mirror body is substantially determined by the cantilever beam assemblies. The natural frequency is substantially independent of the vertical support beams. The natural frequency as defined herein is the undamped frequency of the mirror body about its rotation axis. The vertical support beams define the out-of-plane rocking and vertical mode stiffness for the corresponding mode resonant frequencies. The torsional stiffness can be decoupled from the out-of-plane rocking and vertical mode stiffness so that the out-of-plane rocking and vertical mode frequencies can be set to desired values, such as higher values, without influencing the torsional mode stiffness and resonant frequency. As defined herein, the Y axis is along the rotation axis, the X axis is perpendicular the Y axis on the mirror plane when the mirror is at rest, and the Z axis is perpendicular to and out of the mirror plane when the mirror is at rest.

The MEMS scanning micromirror 30 includes a mirror body 50, a frame 60, cantilever beam assemblies 70, and vertical support beams 40. The mirror body 50 has a mirror 52 on a mirror support 54, and extension bars 56. In one embodiment, the mirror 52 is formed on the mirror support 54. In another embodiment, the mirror 52 is attached to the mirror support 54. The mirror body 50 can be square, rectangular, circular, elliptical, or any other planar shape desired for a particular application. The face of the mirror defines a mirror plane of the mirror support 54. Those skilled in that art will appreciate that the shape of the mirror 52 and the mirror support 54 are independent and can be any shape desired for a particular application, e.g., a circle, ellipse, square, rectangle, or other shape as desired. The extension bars 56 are parallel to rotation axis 58 of the mirror body 50, which is the rotation axis for the MEMS scanning micromirror 30. The mirror body 50 is disposed within a mirror recess 62 of the frame 60.

The frame 60 forms the mirror recess 62 with a recess periphery 64. Opposed frame bars 66 are located on the recess periphery 64 along the rotation axis 58 and provide the connection points for the cantilever beam assemblies 70 and the vertical support beams 40.

The cantilever beam assemblies 70 include cantilever beams 72 fixed to the opposed frame bars 66 perpendicular to the rotation axis 58. The cantilever beam assemblies 70 provide torsional stiffness to the micromirror body 50 about the rotation axis 58. The cantilever beams 72 are also flexibly or compliantly coupled to the end of the extension bars 56 of the mirror body 50 with flexible links 74. The flexible links 74 have low torsional stiffness around their axes parallel to the rotation axis 58 (around the Y axis) and reduced stiffness perpendicular to the rotation axis 58 (the X axis), which allows the mirror body 50 to rotate around the vertical support beams 40 relative to the rotation axis 58. The attachment of the mirror body 50 to the four points away from the rotation axis 58 reduces dynamic deformation in the mirror body 50. The torsional stiffness for rotation of the mirror around the Y axis is defined by the length, width, and most importantly the thickness of the cantilever beams 72 and the distance between flexible links 74 for the pair of cantilever beams 72 in a cantilever beam assembly 70. The combined stiffness in X direction of the vertical support beams 40 and the flexible links 74 prevent the movement of the mirror body 50 perpendicular to the rotation axis 58 (in the X direction) during operation. More detail on the flexible links 74 is provided below for FIG. 5.

The vertical support beams 40 are connected between the opposed frame bars 66 and the mirror body 50 along the rotation axis 58 to support the micromirror body 50 in the frame 60. In one embodiment, the vertical support beams 40 have narrow rectangular cross sections perpendicular to the rotation axis 58, with the long axis of the rectangle perpendicular to the face of the mirror 52 and the mirror body 50, and the short axis of the rectangle parallel to the face of the mirror 52. The torsional stiffness of the MEMS scanning micromirror 30 is provided by the cantilever beam assemblies 70, so the vertical support beams 40 are only required for support of the mirror body 50 and have a negligible effect on the torsional stiffness. The torsional stiffness of the vertical support beams 40 is as low as possible so that the torsional stiffness of the micromirror body rocking movement about the vertical support beams 40 relative to the rotation axis 58 is dominated by the stiffness of the cantilever beams 72. The vertical support beams 40 are sized so that the stiffness against vertical displacement of the mirror body 50 and against its rocking movement perpendicular to the rotation axis 58 (around the X axis) is as high as possible.

The MEMS scanning micromirror 30 can also include actuator 80 to provide torque to drive the mirror body 50 about the rotation axis 58. In one embodiment, the actuator 80 includes mirror combs 82 attached to the extension bars 56 interleaved with frame combs 84 attached to the frame 60. Applying a difference in electrical potential between an interleaved mirror comb 82 and frame comb 84 creates a driving force between the mirror combs 82 and the frame combs 84, which creates a torque on the mirror body 50 about the rotation axis 58. An oscillating electrical potential can be applied to drive the MEMS scanning micromirror 30 at its natural frequency. Other exemplary actuation methods include electromagnetic actuation and piezoelectric actuators. In electromagnetic actuation, the micromirror is "immersed" in a magnetic field and an alternating electric current through the conductive paths creates the required oscillating torque around the rotation axis 58. Piezoelectric actuators can be integrated in the cantilever beams or the cantilever beams can be made of piezoelectric material to produce alternating beam bending forces in response to an electrical signal and generate the required oscillation torque.

The MEMS scanning micromirror 30 can be manufactured from single crystal silicon or polysilicon material using photolithography and DRIE techniques. FIG. 3, in which like elements share like reference numbers with FIG. 1, is a detailed perspective view of comb fingers for a MEMS scanning micromirror in accordance with the present invention. The comb fingers 100 of the mirror comb 82 are interleaved with the comb fingers 110 of the frame comb 84. In one embodiment, the MEMS scanning micromirror can be manufactured from a silicon-on-insulator (SOI) wafer having an upper silicon layer and a lower silicon layer, with an insulating layer between the upper silicon layer and the lower silicon layer. In one embodiment, the mirror comb 82 and the frame comb 84 can be fabricated so that the insulating layer divides the combs parallel to the mirror, producing electrically isolated upper electrical portions and lower electrical portions in each of the comb fingers. The comb fingers 100 of the mirror comb 82 include first electrical portions 102 and second electrical portions 104 separated by insulating layer 106. The comb fingers 110 of the frame comb 84 include first electrical portions 112 and second electrical portions 114 separated by insulating layer 116. Applying a difference in electrical potential between the upper electrical portions in the mirror comb 82 and the lower electrical portions in the frame comb 84, or vice versa, can be used to generate an initial driving force between the mirror combs 82 and the frame combs 84 when the mirror combs 82 and the frame combs 84 are aligned and the mirror body 50 is at rest. The separation of the comb fingers in two (top and bottom) parts allows, by switching between opposed layers, to apply the driving potential (and eventually torque, depending on the comb fingers geometry) for duration greater then half oscillation period per oscillation cycle. In one embodiment, the cantilever beam assemblies can be fabricated in the upper silicon layer of the silicon on insulator wafer and can bring the electrical potential to the top first electrical portions 102 of the mirror combs 82. In another embodiment, the vertical support beams can be fabricated in the lower silicon layer of the silicon on insulator wafer and can bring the electrical potential to the bottom second electrical portions 104 of the mirror combs 82.

Figure 2A:
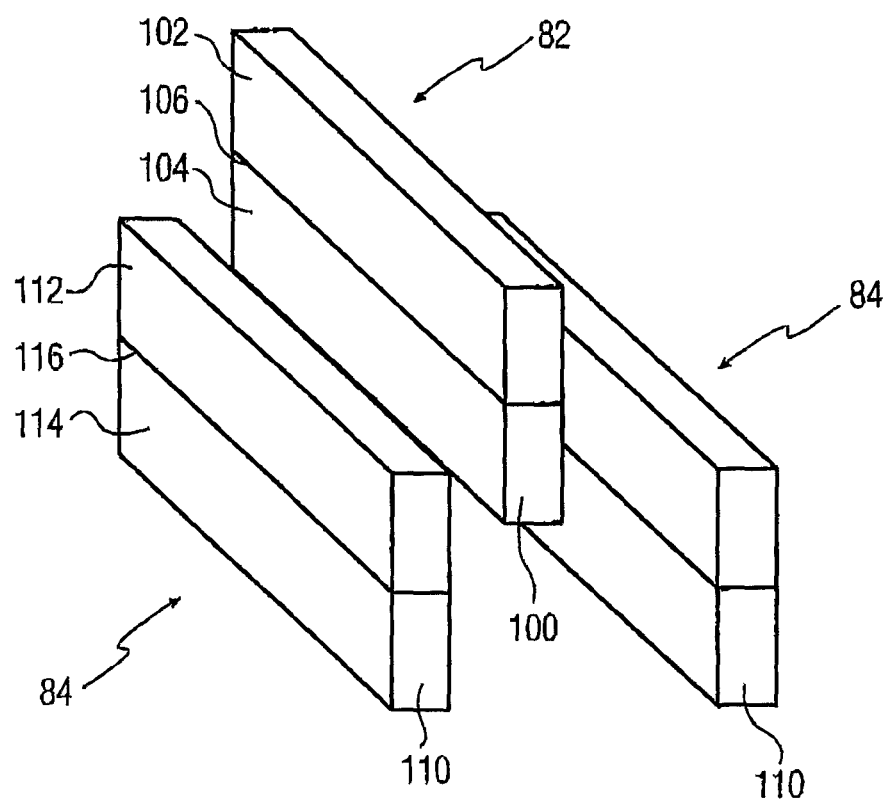
FIG. 2A is a detailed perspective view of comb fingers for a MEMS scanning micromirror in accordance with the present invention.
Figure 2B:
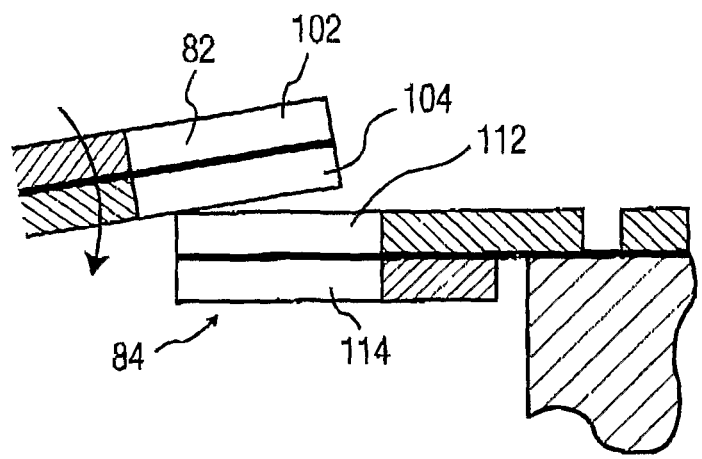
FIGS. 2B-2E illustrate the action of the mirror combs for a MEMS scanning micromirror in accordance with the present invention.

FIGS. 2B-2E illustrate the action of the mirror combs 82 for a MEMS scanning micromirror in accordance with the present invention. Referring to FIG. 2B, the mirror is oscillating, with the mirror comb fingers away from the frame fingers and moving towards them. 102 and 104 connected to ground potential. Driving potential is applied to 112 and 114 from max. amplitude to aligned position of the comb fingers.

Figure 2C:
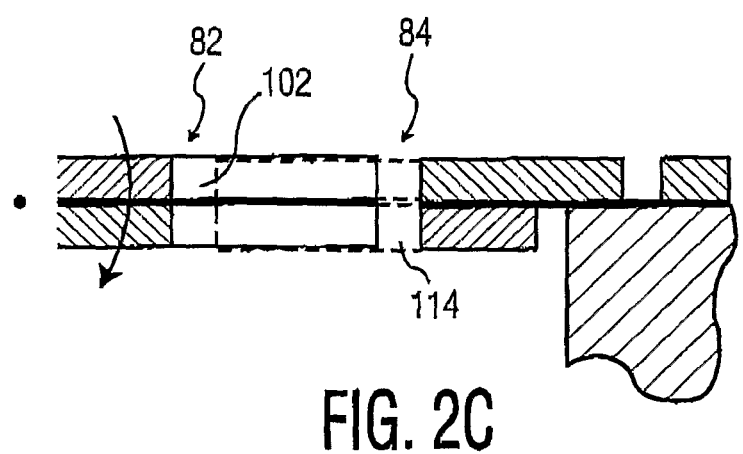

Referring to FIG. 2C, the mirror is oscillating in the clockwise direction, when comb fingers are in aligned position. The driving cycle for the traditional monolith comb fingers stops here. The driving potential must be switched off at aligned comb fingers position if there is no split of the comb fingers in top and bottom electric parts. For split comb fingers of the present invention: Potential is applied between 102 (grounded) and 114 until 102 became aligned with 114, so the split comb fingers inject more energy per oscillation cycle for equal other conditions.

Figure 2D:
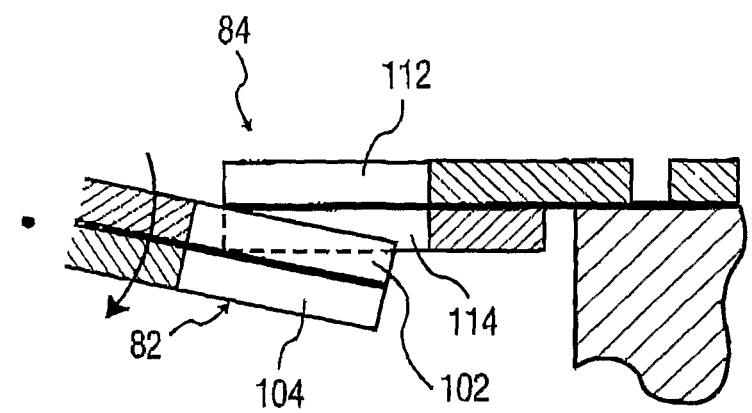
Figure 2E:
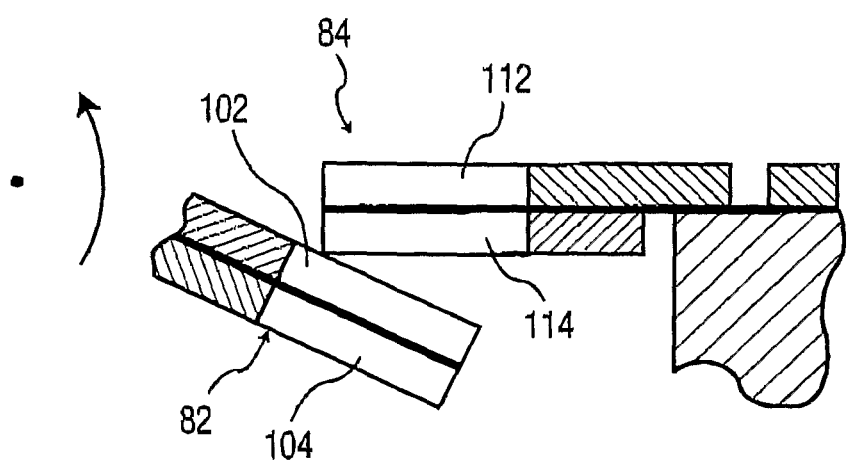

Referring to FIG. 2D, the mirror is oscillating. When the opposing layers 102 and 114 of split comb fingers are in aligned position (no torque created); the driving potential between them must be switched off.

Referring to FIG. 2D, the mirror is oscillating at extreme (FIG. 2B) position. For rotation in opposite direction the driving potentials are switched in "mirrored order" to the given in FIGS. 2B-2D:
1. 102, 104 grounded and 112,114 at driving potential;
2. Driving potential between 104 (grounded) and 112;
3. Driving potentials switched off.

Figure 3A:
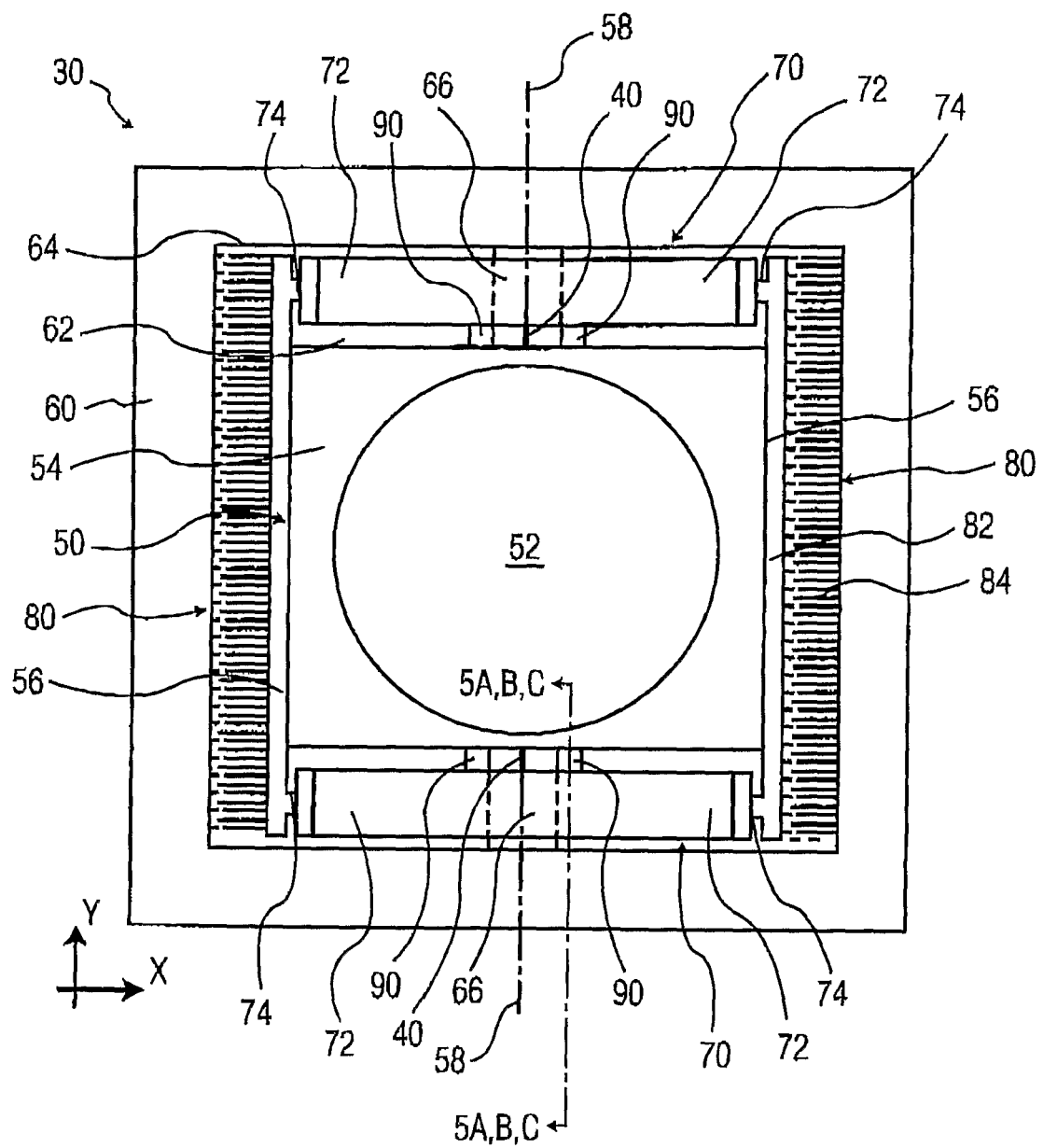
FIGS. 3A-3B are top views of other embodiments of a MEMS scanning micromirror in accordance with the present invention.
Figure 3B:
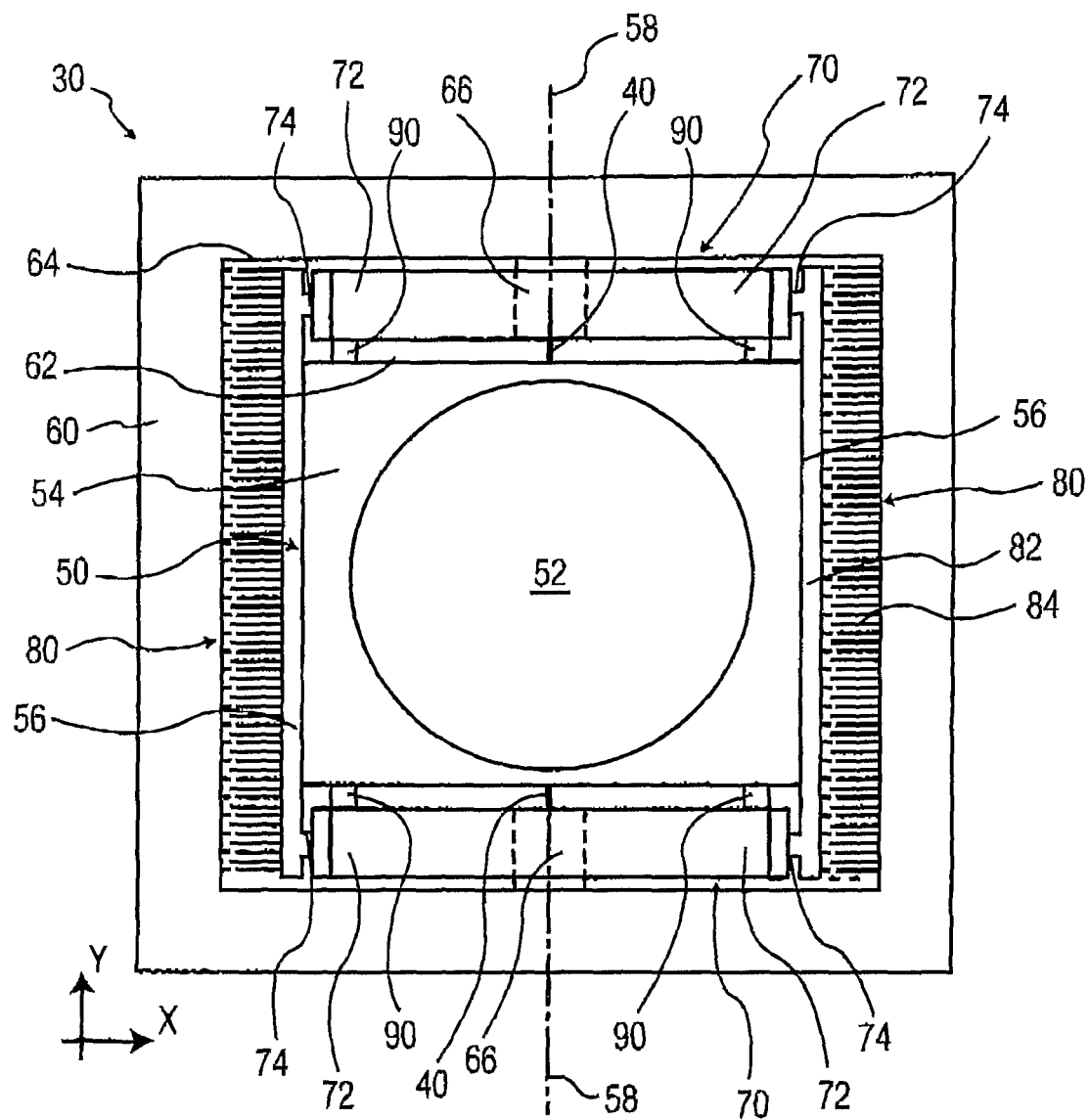

FIGS. 3A-3B, in which like elements share like reference numbers with each other and with FIG. 1, are top views of other embodiments of a MEMS scanning micromirror in accordance with the present invention. In these embodiments, leaf springs flexibly coupled between the cantilever beams of the cantilever beam assemblies and the mirror body can be used to stiffen the mirror body of the MEMS scanning micromirror against in-plane disturbances and increase in-plane slide and rotation stiffness of the mirror suspension. The leaf springs springily couple the micromirror body to the cantilever beam assemblies.

The leaf springs can be positioned along the cantilever beams as desired for a particular application. Referring to FIG. 3A, leaf springs 90 are flexibly coupled between the cantilever beams 72 of the cantilever beam assemblies 70 and the mirror body 50. In this example, the leaf springs 90 are near the vertical support beams 40 and the opposed frame bars 66. Referring to FIG. 3B, the leaf springs 90 are flexibly coupled between the cantilever beams 72 of the cantilever beam assemblies 70 and the mirror body 50. In this example, the leaf springs 90 are near the flexible links 74.

Figure 4A:
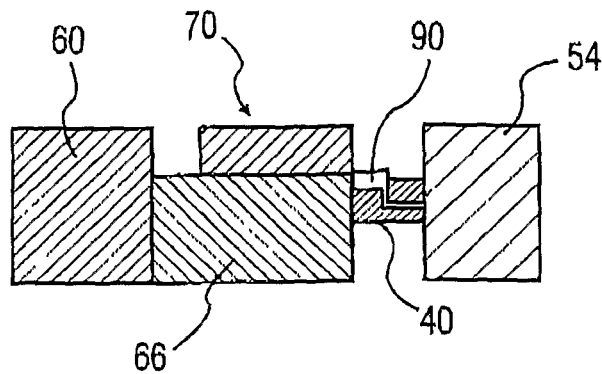
FIGS. 4A-4C are detailed cross section views of leaf springs for a MEMS scanning micromirror in accordance with the present invention.
Figure 4B:
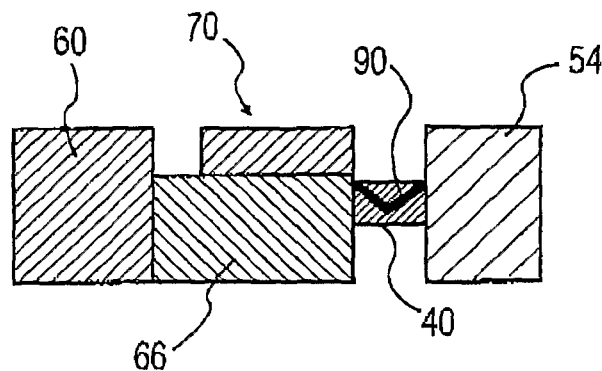
Figure 4C:
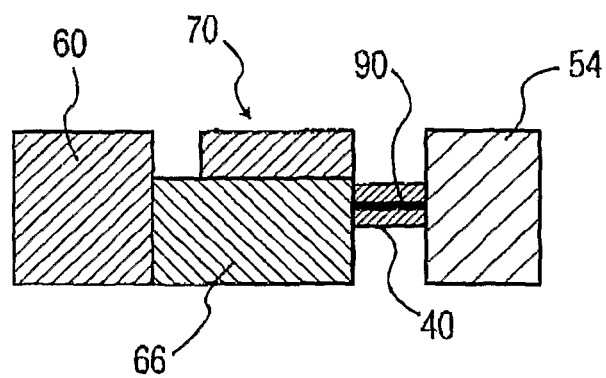

FIGS. 4A-4C, in which like elements share like reference numbers with each other and with FIG. 3A-3B, are detailed cross section views along section B-B of FIG. 3A of leaf springs for a MEMS scanning micromirror in accordance with the present invention. The leaf springs 90 have different shapes to provide different stiffness. Referring to FIGS. 4A, 4B, and 4C, the leaf springs 90 are L shaped, V shaped, and flat, respectively. The leaf springs 90 can be placed at about the same height relative to the mirror (in the Z direction) as the vertical support beams 40. In one embodiment, the lower leg of the L in the L shaped leaf spring is at the same height as the rotation axis 58. In one embodiment, the lower tip of the V in the V shaped leaf spring is at the same height as the rotation axis 58. In one embodiment, the flat leaf spring is at the same height as the rotation axis 58.

Figure 5A:
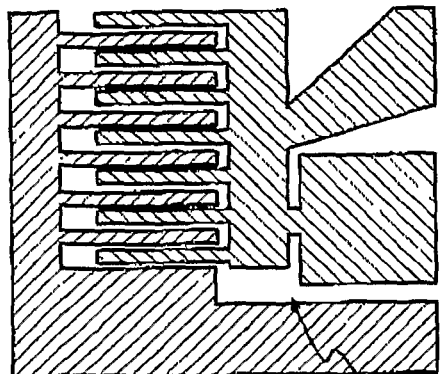
FIGS. 5A-5E are detailed top views of flexible links of a mirror body for a MEMS scanning micromirror in accordance with the present invention.
Figure 5B:
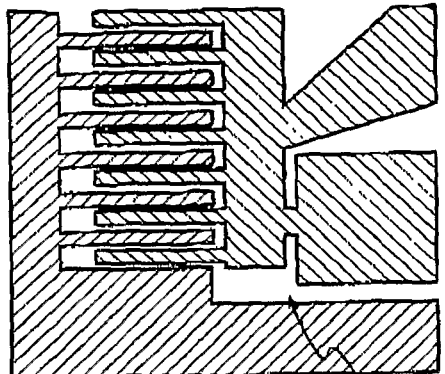
Figure 5C:
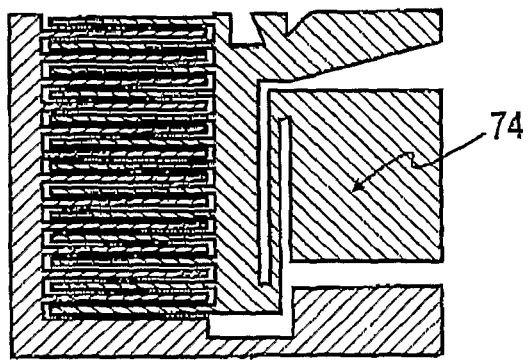
Figure 5D:
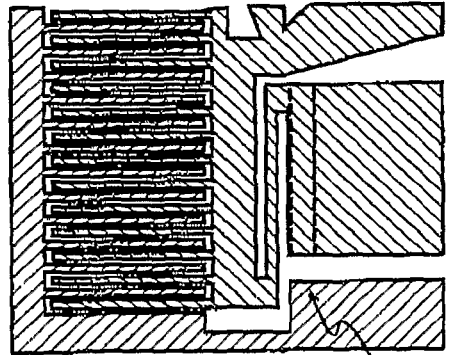
Figure 5E:
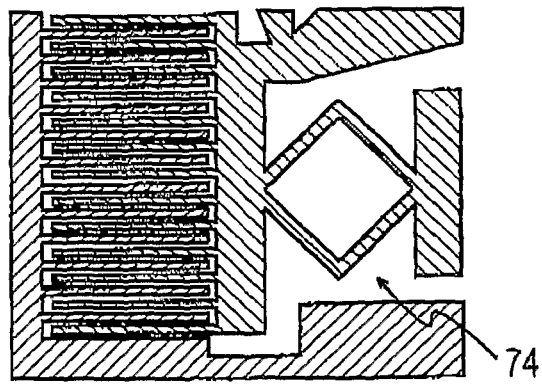

FIGS. 5A-5E are detailed top views of flexible links of a mirror body for a MEMS scanning micromirror in accordance with the present invention. In FIG. 5A, the flexible link 74 is a high aspect ratio flexure connected to the cantilever beam at both ends and in the middle to the extension bars. Typical dimensions for 1 mm micromirror device are: Width 2.5-4 μm, length 60-80 μm, the height is the same as the thickness of the cantilever beams. The width at the connection points is around 10 μm. In FIG. 5B, the flexible link 74 includes additional flexure elements allowing small X-axis translations. In FIGS. 5C-5D, the flexible link 74 allows a greater deformation in X direction while keeping a high bending stiffness in vertical direction and a high stiffness against in-plane rotation of the micromirror. The flexible links length is increased to reduce the stress caused by translation in X direction. In FIG. 5C, the flexible link is made in the same layer as the cantilever beams, so the stiffness of the flexure is limited by the thickness of the cantilevers. In FIG. 5D, the flexible link 74 has increased stiffness in the vertical direction and against bending in the Y-Z plane achieved by fabricating them with increased height in the bulk single crystal silicon material under the insulating layer. In this case, additional structure as an electrical connection is needed to provide the potential to the top part of the moveable comb fingers. In FIG. 5E, the flexible link 74 the L shaped flexible links (rotated at 45 degrees) connecting the extension bar and the cantilever beam.

Figure 6:
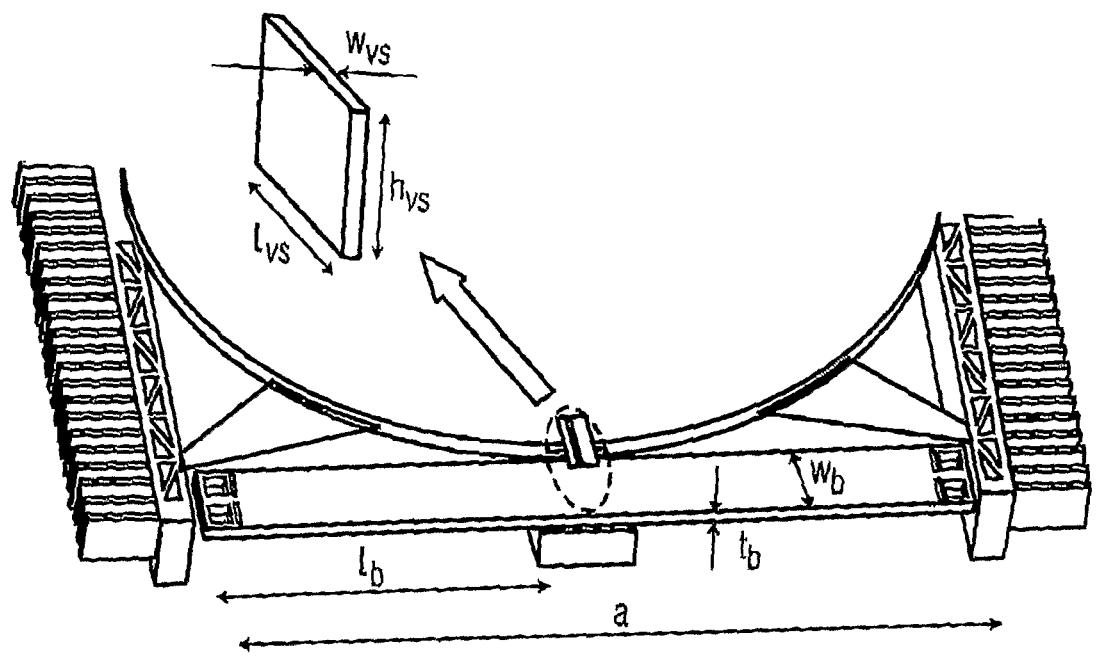
FIG. 6 is a detailed perspective view illustrating dimensions of a mirror body for a MEMS scanning micromirror in accordance with the present invention.

FIG. 6 is a detailed perspective view illustrating dimensions of a mirror body for a MEMS scanning micromirror in accordance with the present invention. In one exemplary embodiment, the dimensions of the cantilever beams are:

Cantilever beam length $l_b$=420 µm
Cantilever beam width $w_b$=100 µm
Cantilever beam thickness $t_b$=17.5 µm
Distance between opposite suspension points a=950 µm.

In one exemplary embodiment, the dimensions of the vertical support beams are:

Vertical support beam width $w_{vs}$=6.2 µm
Vertical support beam height $h_{vs}$=36 µm
Vertical support beam length $l_{vs}$=62 µm In another exemplary embodiment, the dimensions of the vertical support beams providing a combined stiffness of the links in X direction is $1.25 \times 10^3$ N/m are:

Vertical support beam width $w_{vs}$=6.2 µm
Vertical support beam height $h_{vs}$=36 µm
Vertical support beam length $l_{vs}$=62 µm The combined stiffness of the vertical beams in X direction is $1.0 \times 10^4$ N/m. The beam stiffness dominates the horizontal slide natural frequency. The links and cantilever beam stiffness in Y direction define the in-plane rotation mode resonance frequency.

The oscillation frequency of the micromirror scanners depends from the torsional stiffness of the suspension and its mass inertia moment around the tilt axis. The torsional stiffness contributed by the cantilever beams bending stiffness dominates the fundamental mode resonant frequency of the micromirror. For small oscillation angles, this stiffness can be found from the following formula:

$$S_t = E \frac{a^2 \cdot w_b t_b^3}{4 l_b^3}$$

For a 1 mm micromirror, the torsional stiffness contributed by the cantilever beams is $2.3 \times 10^{-4}$ Nm/rad.

The torsional stiffness from the vertical support beams with the above given dimensions is $4.6 \times 10^{-6}$ Nm/rad, which is 50 times less than the delivered by the cantilever beams torsional stiffness. The vertical support beams influence with less than 1% the 18.7 kHz fundamental mode resonant frequency of our 1 mm micromirror design. The mass inertia moment is about $1.7 \times 10^{-14}$ kgm²

The flexible links 74 with combined torsional stiffness around $1 \times 10^{-6}$ Nm/rad contribute even less to the increase of the micromirror fundamental mode frequency.

In the same design, the cantilever beams contribute with around $1.1 \times 10^3$ N/m bending stiffness to the out-of-plane oscillation mode, while the stiffness of the vertical support beams is $6.1 \times 10^5$ N/m.

The cantilever beams dominate the torsional stiffness of the micromirror. The vertical support beams dominate the stiffness for the out-of-plane oscillation modes, which have great impact on the image quality. The possibility to define the fundamental mode and the higher order resonance frequencies with a greater flexibility makes it easier to design better quality scanning systems. FEM Simulations showed that the combined suspension has advantages in preventing parasitic mode oscillations, as vertical and out-of-plain rocking, by increasing their resonance frequencies to greater values compared to torsion-beam suspended micromirrors.

The table below shows the simulation results for optimized geometries of two torsion-beam suspended micromirrors and a micromirror with combined suspension (having the same micromirror size; similar tilt stiffness, mass inertia moments, stress in the suspension elements and surface deformation):

| Frequency kHz | Torsion beam suspended micromirror with rectangular shape | Torsion beam suspended micromirror with circular shape | Micromirror with combined suspension |
|---|---|---|---|
| Fundamental mode | 18.6 | 18.7 | 18.7 |
| Vertical mode | 93 | 84 | 144 |
| Out of plane rocking | 230 | 245 | 255 |

Figure 7:
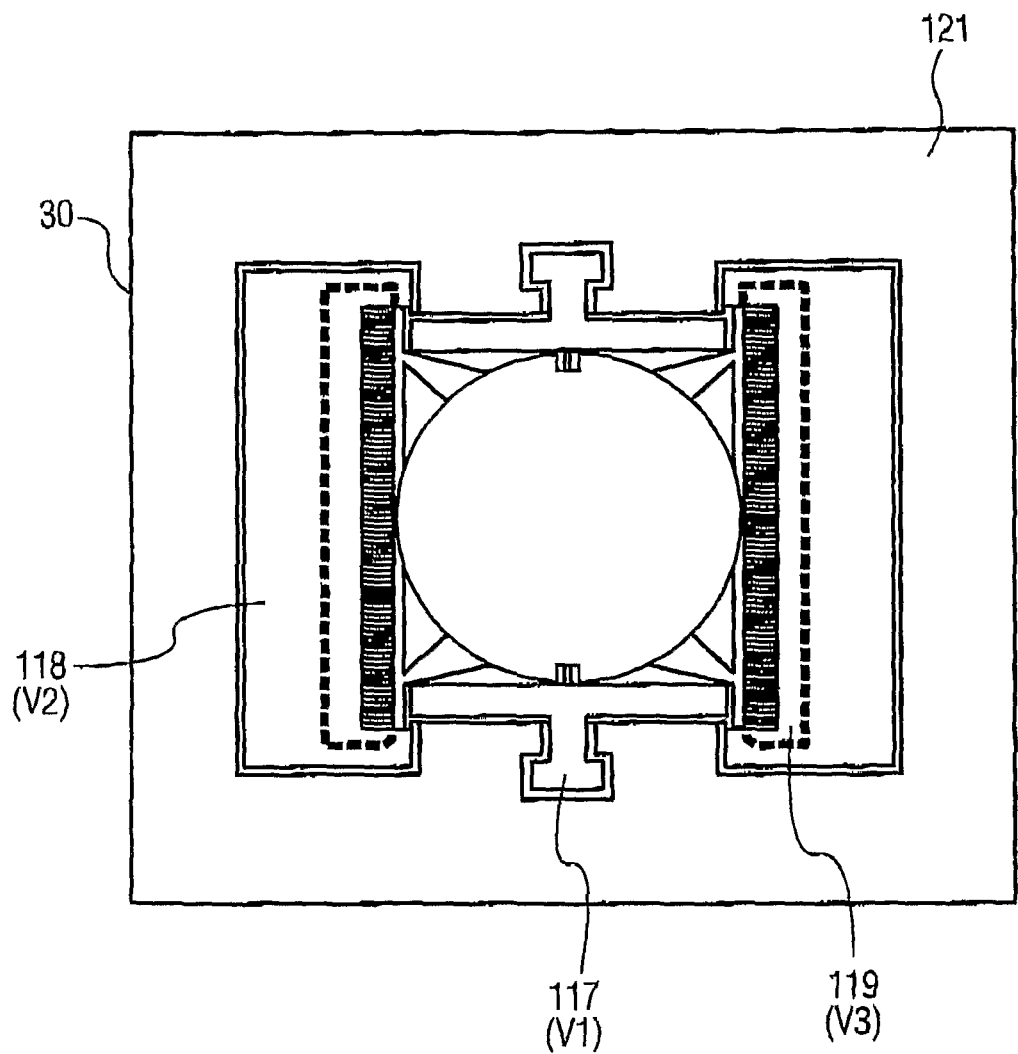
FIG. 7 is a plan view of a picobeamer micromirror in an embodiment of the present invention, showing electrical connections for device actuation.

FIG. 7 is a plan view of a picobeamer micromirror in an embodiment of the present invention. Electrical connections for device actuation are at a wafer handle layer and bottom part of a micromirror 30, a top half of moveable comb fingers 117, a top-half of stator comb fingers 118 and a bottom half of stator comb fingers 119. An area of the micromirror 30 is left as "free real estate" 121. Potentials V0 at the wafer handle layer and bottom part of the micromirror 30, V1 at the top half of the moveable comb fingers 117, V2 at the top-half of stator comb fingers 118 and V3 at the bottom half of stator combfingers 119 may be applied during operation of a display. Driving potentials used may be, for example: during oscillation launch V0 grounded, V2 driven with square pulses. During steady state oscillation V0=V1=grounded and V2=V3. The device layer around the micro-mirror allows integrating of control electronics.

Figure 8:
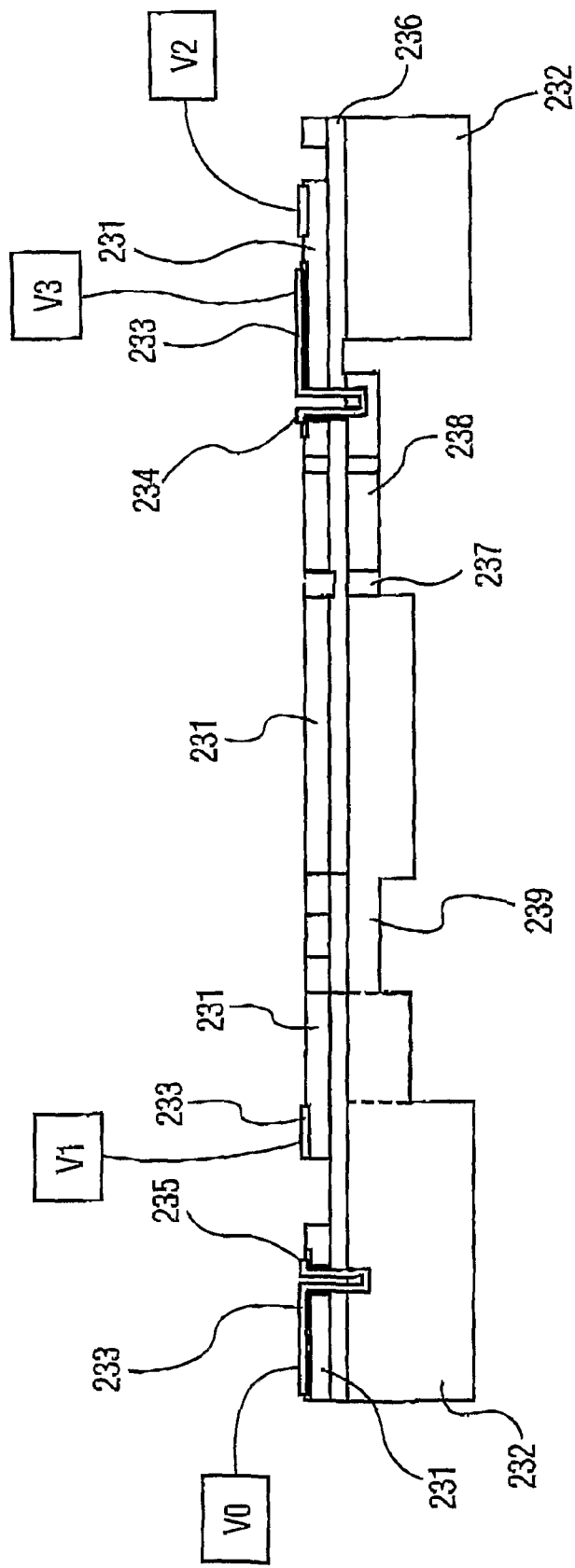
FIG. 8 is a detailed cross section view of wafer layers and points of application of driving potentials in an embodiment of the present invention.

FIG. 8 is a detailed cross section view of wafer layers and points of application of driving potentials in an embodiment of the present invention. A picobeamer micromirror has a silicon top/device layer 231 and a silicon bottom/handle layer 232. The silicon top/device layer 231 has aluminum bonding pads and wirebonds 233 and vias 234, 235 extending to the silicon bottom/handle layer 232 through a buried oxide (BOX) layer 236. The picobeamer micromirror has moveable 237 and stationary 238 comb fingers and vertical support beam 239. V0. V1, V2 and V3 are applied as shown. Driving potentials used may be, for example: during oscillation launch V0 grounded, V2 driven with square pulses. During steady state oscillation, V0=V1=grounded and V2=V3.

Figure 9:
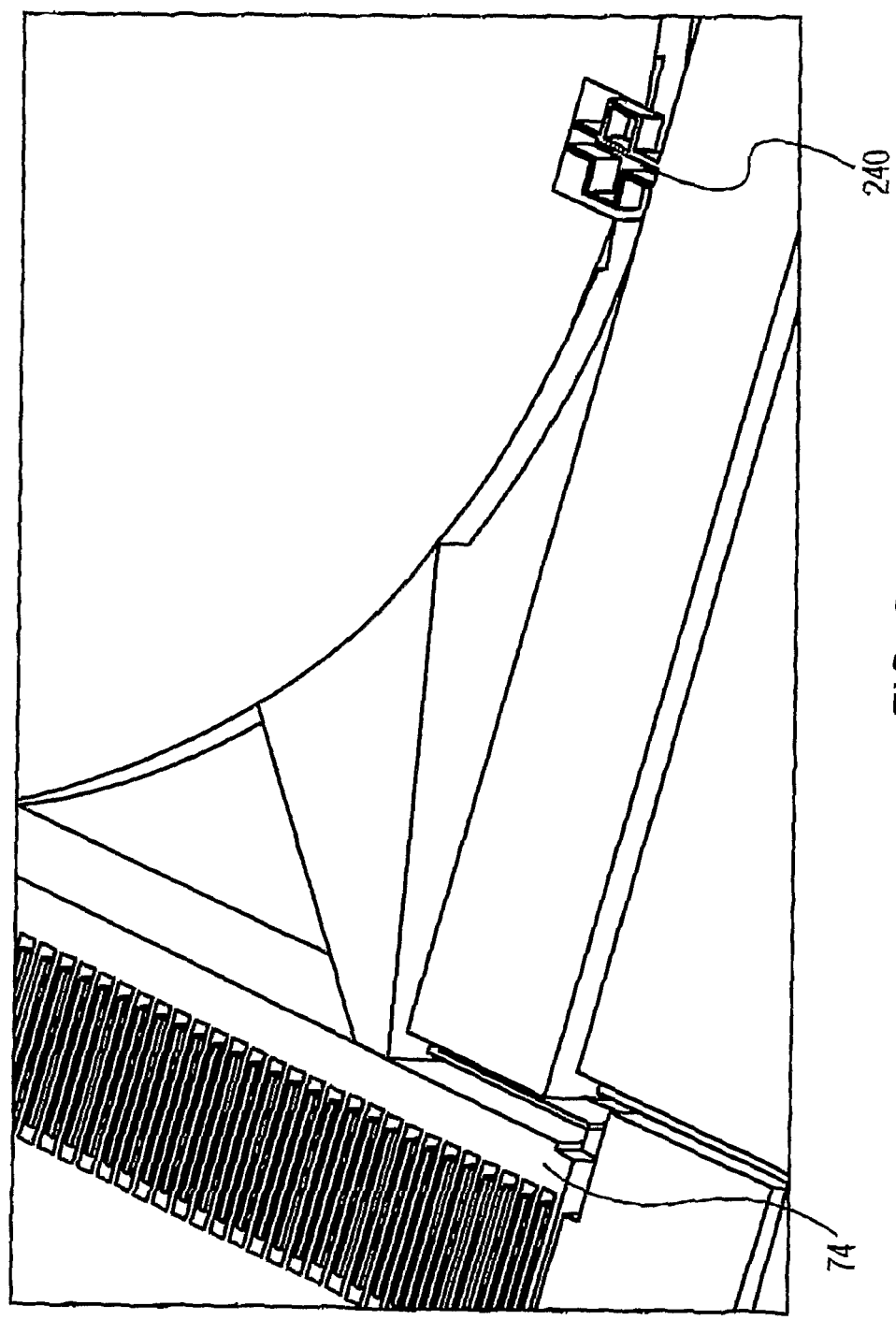
FIG. 9 is a perspective view of flexible links of a mirror body of a picobeamer micromirror in accordance with an embodiment of the present invention.

FIG. 9 is a perspective view of flexible links of a mirror body of a picobeamer micromirror in accordance with an embodiment of the present invention. Flexible link 74 is fabricated in second silicon layer 206. Additional electrical connections 240 are provided to link 74 and an electrical portion 102.

While the embodiments of the invention disclosed herein are presently considered to be preferred, various changes and modifications can be made without departing from the scope of the invention. The scope of the invention is indicated in the appended claims, and all changes that come within the meaning and range of equivalents are intended to be embraced therein.

The invention claimed is:

1. A MEMS scanning micromirror comprising:
a mirror body having a mirror support, the mirror body having a rotation axis with a pair of extension bars parallel to the rotation axis;

a mirror supported on the mirror support of the mirror body;

a frame forming a mirror recess with a recess periphery, the frame having a pair of opposed frame bars on the recess periphery along the rotation axis;

a pair of cantilever beam assemblies, each of the pair of cantilever beam assemblies being fixed to one of the pair of opposed frame bars and coupled to one end of the pair of extension bars; and a pair of vertical support beams connected between each of the pair of opposed frame bars to the mirror body along the rotation axis.

2. The MEMS scanning micromirror of claim 1, further comprising an actuator operably connected to the mirror body to provide torque about the rotation axis.

3. The MEMS scanning micromirror of claim 2, wherein the actuator comprises:
a first mirror comb attached to one of the pair of extension bars;
a second mirror comb attached to the other one of the pair of extension bars; and
a first frame comb and a second frame comb attached to the frame
wherein comb fingers of the first mirror comb are interleaved with comb fingers of the first frame comb, and comb fingers of the second mirror comb are interleaved with comb fingers of the second frame comb.

4. The MEMS scanning micromirror of claim 3, wherein the first mirror comb has a first electrical portion and a second electrical portion, the first electrical portion and the second electrical portion being separated by an insulating layer.

5. The MEMS scanning micromirror of claim 1, wherein natural frequency of the mirror body is substantially determined by the pair of cantilever beam assemblies.

6. The MEMS scanning micromirror of claim 1, wherein natural frequency of the mirror body is substantially independent of the pair of vertical support beams.

7. The MEMS scanning micromirror of claim 1, wherein each of the pair of cantilever beam assemblies is coupled to one end of the pair of extension bars through a flexible link.

8. The MEMS scanning micromirror of claim 1, wherein each of the pair of vertical support beams have a rectangular cross section, with a long axis of the rectangular cross section perpendicular to the mirror body.

9. The MEMS scanning micromirror of claim 1, further comprising leaf springs coupled between each of the pair of the cantilever beam assemblies and the mirror body.

10. The MEMS scanning micromirror of claim 9, wherein the shape of the leaf springs is selected from the group consisting of L shaped, V shaped, and flat.

11. A MEMS scanning micromirror comprising:
a mirror body having a mirror support, the mirror body having a rotation axis with a first extension bar and a second extension bar parallel to the rotation axis 58;
a mirror supported on the mirror support of the mirror body;
a frame having a mirror recess with a recess periphery, the frame having a first opposed frame bar and a second opposed frame bar on the recess periphery along the rotation axis;
a first cantilever beam fixed to the first opposed frame bar perpendicular to the rotation axis and coupled to a first end of the first extension bar;
a second cantilever beam fixed to the first opposed frame bar perpendicular to the rotation axis and coupled to a first end of the second extension bar;
a third cantilever beam fixed to the second opposed frame bar perpendicular to the rotation axis and coupled to a second end of the first extension bar;
a fourth cantilever beam fixed to the second opposed frame bar perpendicular to the rotation axis and coupled to a second end of the second extension bar;
a first vertical support beam connected between the first frame opposed bar and the mirror body along the rotation axis; and
a second vertical support beam connected between the second opposed frame bar and the mirror body along the rotation axis.

12. The MEMS scanning micromirror of claim 11, further comprising an actuator operably connected to the mirror body to provide torque about the rotation axis.

13. The MEMS scanning micromirror of claim 12, wherein the actuator comprises:
a first mirror comb attached to the first extension bar;
a second mirror comb attached to the second extension bar; and
a first frame comb and a second frame comb attached to the frame,
wherein comb fingers of the first mirror comb are interleaved with comb fingers of the first frame comb, and comb fingers of the second mirror comb are interleaved with comb fingers of the second frame comb.

14. The MEMS scanning micromirror of claim 13, wherein the first mirror comb has a first electrical portion and a second electrical portion, the first electrical portion and the second electrical portion being separated by an insulating layer.

15. The MEMS scanning micromirror of claim 11, wherein natural frequency of the mirror body is substantially determined by the first cantilever beam, the second cantilever beam, the third cantilever beam, and the fourth cantilever beam.

16. The MEMS scanning micromirror of claim 11, wherein natural frequency of the mirror body is substantially independent of the first vertical support beam and the second vertical support beam.

17. The MEMS scanning micromirror of claim 11, wherein:
the first cantilever beam is coupled to the first end of the first extension bar through a first flexible link;
the second cantilever beam is coupled to a first end of the second extension bar through a second flexible link;
the third cantilever beam is coupled to a second end of the first extension bar through a third flexible link; and
the fourth cantilever beam is coupled to a second end of the second extension bar through a fourth flexible link.

18. The MEMS scanning micromirror of claim 11, wherein the first vertical support beam and the second vertical support beam each have a rectangular cross section, with a long axis of the rectangular cross section perpendicular to the mirror body.

19. The MEMS scanning micromirror of claim 11 further comprising:
a first leaf spring coupled between the first cantilever beam and the mirror body;
a second leaf spring coupled between the second cantilever beam and the mirror body;
a third leaf spring coupled between the third cantilever beam and the mirror body; and
a fourth leaf spring coupled between the fourth cantilever beam and the mirror body.

20. The MEMS scanning micromirror of claim 19, wherein the shape of the first leaf spring, the second leaf spring, the third leaf spring, and the fourth leaf spring is selected from the group consisting of L shaped, V shaped, and flat.

21. A MEMS scanning micromirror system comprising:
a frame;
a micromirror body having a mirror support and a rotation axis;
a mirror supported on the mirror support of the mirror body;
means for supporting the micromirror body in the frame; and
means for providing torsional stiffness to the micromirror body about the rotation axis.

22. The MEMS scanning micromirror system of claim 21, wherein the supporting means are vertical support beams and the torsional stiffness providing means are cantilever beam assemblies.

23. The MEMS scanning micromirror system of claim 21, further comprising means for applying torque to the micromirror body about the rotation axis.

24. The MEMS scanning micromirror system of claim 21 further comprising means for springily coupling the micromirror body to the torsional stiffness providing means.

* * * * *

UNITED STATES PATENT AND TRADEMARK OFFICE
CERTIFICATE OF CORRECTION

PATENT NO.       : 8,526,089 B2                                              Page 1 of 1
APPLICATION NO.  : 12/681622
DATED            : September 3, 2013
INVENTOR(S)      : Krastev et al.

It is certified that error appears in the above-identified patent and that said Letters Patent is hereby corrected as shown below:

ON THE TITLE PAGE:

Item [75] Inventors:    delete "HERMAN M.J. SOEMERS"

should read -- HERMANUS M.J.R. SOEMERS --

Signed and Sealed this
Twenty-fifth Day of February, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,526,089 B2
APPLICATION NO. : 12/681622
DATED : September 3, 2013
INVENTOR(S) : Krastev et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 660 days.

Signed and Sealed this
Twenty-third Day of May, 2017

Michelle K. Lee
*Director of the United States Patent and Trademark Office*